US012080216B2

(12) United States Patent
Lin et al.

(10) Patent No.: US 12,080,216 B2
(45) Date of Patent: Sep. 3, 2024

(54) CONTROL METHOD OF DISPLAY PANEL AND DISPLAY DEVICE

(71) Applicant: TCL China Star Optoelectronics Technology Co., Ltd., Guangdong (CN)

(72) Inventors: Qiqi Lin, Guangdong (CN); Yu Huang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/419,752

(22) PCT Filed: Jun. 8, 2021

(86) PCT No.: PCT/CN2021/098969

§ 371 (c)(1),
(2) Date: Dec. 8, 2022

(87) PCT Pub. No.: WO2022/252259

PCT Pub. Date: Dec. 8, 2022

(65) Prior Publication Data

US 2024/0013698 A1 Jan. 11, 2024

(30) Foreign Application Priority Data

May 31, 2021 (CN) ......................... 202110598485.9

(51) Int. Cl.
*G09G 5/10* (2006.01)
*G09G 3/20* (2006.01)
*G09G 3/36* (2006.01)

(52) U.S. Cl.
CPC ......... *G09G 3/2074* (2013.01); *G09G 3/3607* (2013.01); *G09G 2320/0209* (2013.01); *G09G 2320/0233* (2013.01)

(58) Field of Classification Search
CPC ............... G09G 3/2074; G09G 3/3607; G09G 2320/0209; G09G 2320/0233
USPC ........................................................... 345/690
See application file for complete search history.

(56) References Cited

U.S. PATENT DOCUMENTS

2018/0144719 A1 5/2018 Lee et al.
2021/0233457 A1* 7/2021 Xiong .................. G09G 3/2074
2021/0295789 A1* 9/2021 Kang ................... G09G 3/3607

FOREIGN PATENT DOCUMENTS

CN 106023916 10/2016
CN 107958651 4/2018
CN 108597428 9/2018
CN 108962179 * 12/2018 ............... G09G 3/36

(Continued)

*Primary Examiner* — Jennifer T Nguyen

(57) ABSTRACT

A control method of a display panel and a display device are provided. In the method, at least one binding-point grayscale value is obtained at first; an initial-state control parameter, an initial-state brightness parameter, and a reference brightness parameter of a to-be-regulated region are determined according to each of the binding-point grayscale value; and a relative compensation brightness parameter of the binding-point grayscale value is determined according to the initial-state control parameter, the initial-state brightness parameter, and the reference brightness parameter of the binding-point grayscale value when a ratio of the initial-state brightness parameter to the reference brightness parameter is not within a preset range.

18 Claims, 3 Drawing Sheets

(56) References Cited

FOREIGN PATENT DOCUMENTS

| | | |
|---|---|---|
| CN | 109712584 | 5/2019 |
| CN | 109949744 | 6/2019 |
| CN | 110288556 | 9/2019 |
| CN | 110400532 | 11/2019 |
| CN | 111564131 | 8/2020 |
| CN | 111754905 | 10/2020 |
| CN | 111816113 | 10/2020 |
| CN | 111816125 | 10/2020 |
| CN | 111968572 | 11/2020 |
| CN | 112216243 | 1/2021 |
| CN | 112530346 | 3/2021 |
| CN | 112863421 | 5/2021 |
| WO | WO 2021/066383 | 4/2021 |

* cited by examiner

CONTROL METHOD OF DISPLAY PANEL AND DISPLAY DEVICE

RELATED APPLICATIONS

This application is a National Phase of PCT Patent Application No. PCT/CN2021/098969 having International filing date of Jun. 8, 2021, which claims the benefit of priority of Chinese Patent Application No. 202110598485.9 filed on May 31, 2021. The contents of the above applications are all incorporated by reference as if fully set forth herein in their entirety.

FIELD AND BACKGROUND OF THE INVENTION

The present invention relates to the field of display technology, particularly to manufacturing of display devices, and specifically to a control method of a display panel and a display device.

Liquid crystal displays (LCDs) have advantages of long service life, easy colorization, not easy to burn screens, etc.

Coupling capacitors of data lines and pixel electrodes between two sides thereof allow voltage variations in the two corresponding pixel electrodes, resulting in brightness changing in two corresponding sub-pixels, thereby causing a vertical crosstalk phenomenon and reducing quality of displayed images.

Therefore, providing a control method of a display panel and a display device to remedy the vertical crosstalk phenomenon in the display screens to improve quality of display screens is necessary.

SUMMARY OF THE INVENTION

A purpose of the present invention is to provide a control method of a display panel and a display device to solve a technical problem that the vertical crosstalk phenomenon exists in the display panel.

The present invention provides a control method of a display panel, including:

obtaining at least one binding-point grayscale value;

determining an initial-state control parameter, an initial-state brightness parameter, and a reference brightness parameter corresponding to to-be-regulated regions according to each of the binding-point grayscale value;

judging whether a ratio of the initial-state brightness parameter to the reference brightness parameter corresponding to each binding-point grayscale value is within a preset range; and determining a relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range;

using 0 as the relative compensation brightness parameter corresponding to the binding-point grayscale value when the ratio of the initial-state brightness parameter to the reference brightness parameter corresponding to the at least one binding-point grayscale value is within the preset range;

obtaining a relative parameter of a hopping region, wherein a plurality of data lines are shared in the hopping region and the to-be-regulated region; and determining an absolute compensation brightness parameter corresponding to the binding-point grayscale value according to the relative parameter and the relative compensation brightness parameter and on a basis of an absolute parameter.

In one embodiment, the step of determining the corresponding initial-state brightness parameter according to each binding-point grayscale value includes:

determining the corresponding initial-state control parameter according to the binding-point grayscale value, regulating the to-be-regulated region according to the initial-state control parameter, and obtaining a regulated brightness value of the to-be-regulated region for inclusion in the corresponding initial-state brightness parameter.

In one embodiment, the step of determining the corresponding initial-state brightness parameter according to each binding-point grayscale value includes:

determining the corresponding initial-state control parameter according to the binding-point grayscale value, regulating a reference region according to the initial-state control parameter, and obtaining a regulated brightness value of the reference region for inclusion in the corresponding reference brightness parameter, wherein a vertical crosstalk phenomenon in the reference region is weaker than a vertical crosstalk phenomenon in the to-be-regulated region.

In one embodiment, the step of determining the corresponding initial-state brightness parameter according to each binding-point grayscale value further includes:

determining the corresponding initial-state control parameter according to the binding-point grayscale value, regulating the to-be-regulated region according to the initial-state control parameter, and obtaining a regulated color coordinate of the to-be-regulated region for inclusion in the corresponding initial-state brightness parameter.

In one embodiment, the step of determining the relative compensation brightness parameter corresponding to the binding-point grayscale value according to the initial-state control parameter, the initial-state brightness parameters, and the reference brightness parameter corresponding to each binding-point grayscale value, the control method of the display panel includes:

regulating a control parameter of the to-be-regulated region until a brightness parameter of the to-be-regulated region changes into a corresponding final-state brightness parameter from the initial-state brightness parameter, wherein a ratio of the corresponding final-state brightness parameter to the reference brightness parameter is within the preset range; obtaining a final-state control parameter corresponding to the to-be-regulated region, wherein the final-state control parameter allows the final-state brightness parameter to be in the to-be-regulated region; and determining the corresponding relative compensation brightness parameter according to the corresponding initial-state control parameter and the corresponding final-state control parameter.

In one embodiment, the step of obtaining the at least one binding-point grayscale value includes:

obtaining at least two binding-point grayscale values, wherein after the step of determining the relative compensation brightness parameter corresponding to the binding-point grayscale value according to the initial-state control parameter, the initial-state brightness parameters, and the reference brightness parameter corresponding to each binding-point grayscale value, the control method of the display panel includes:

determining the relative compensation brightness parameter corresponding to each of the binding-point grayscale values according to the relative compensation brightness parameter corresponding to each of the binding-point grayscale values, and determining a plurality of relative compensation brightness parameters corresponding to a plurality of non-binding-point grayscale values, wherein two of the binding-point grayscale values comprise at least one of the non-binding-point grayscale values.

The present invention further provides another control method of the display panel, including obtaining at least one binding-point grayscale value;

determining an initial-state control parameter, an initial-state brightness parameter, and a reference brightness parameter corresponding to to-be-regulated regions according to each of the binding-point grayscale value;

judging whether a ratio of the initial-state brightness parameter to the reference brightness parameter corresponding to each binding-point grayscale value is within a preset range; and determining a relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range;

In one embodiment, the step of determining the corresponding initial-state brightness parameter according to each binding-point grayscale value includes:

determining the corresponding initial-state control parameter according to the binding-point grayscale value, regulating the to-be-regulated region according to the initial-state control parameter, and obtaining a regulated brightness value of the to-be-regulated region for inclusion in the corresponding initial-state brightness parameter.

In one embodiment, the step of determining the corresponding initial-state brightness parameter according to each binding-point grayscale value includes:

determining the corresponding initial-state control parameter according to the binding-point grayscale value, regulating a reference region according to the initial-state control parameter, and obtaining a regulated brightness value of the reference region for inclusion in the corresponding reference brightness parameter, wherein a vertical crosstalk phenomenon in the reference region is weaker than a vertical crosstalk phenomenon in the to-be-regulated region.

In one embodiment, the step of determining the corresponding initial-state brightness parameter according to each binding-point grayscale value further includes:

determining the corresponding initial-state control parameter according to the binding-point grayscale value, regulating the to-be-regulated region according to the initial-state control parameter, and obtaining a regulated color coordinate of the to-be-regulated region for inclusion in the corresponding initial-state brightness parameter.

In one embodiment, the step of determining the relative compensation brightness parameter corresponding to the binding-point grayscale value according to the initial-state control parameter, the initial-state brightness parameters, and the reference brightness parameter corresponding to each binding-point grayscale value, the control method of the display panel includes:

regulating a control parameter of the to-be-regulated region until a brightness parameter of the to-be-regulated region changes into a corresponding final-state brightness parameter from the initial-state brightness parameter, wherein a ratio of the corresponding final-state brightness parameter to the reference brightness parameter is within the preset range; obtaining a final-state control parameter corresponding to the to-be-regulated region, wherein the final-state control parameter allows the final-state brightness parameter to be in the to-be-regulated region; and determining the corresponding relative compensation brightness parameter according to the corresponding initial-state control parameter and the corresponding final-state control parameter.

In one embodiment, after the step of judging whether the ratio of the initial-state brightness parameter to the reference brightness parameter corresponding to each binding-point grayscale value is within the preset range, the control method of the display panel includes:

using 0 as the relative compensation brightness parameter corresponding to the binding-point grayscale value when the ratio of the initial-state brightness parameter to the reference brightness parameter corresponding to the at least one binding-point grayscale value is within the preset range.

In one embodiment, the step of obtaining the at least one binding-point grayscale value includes:

obtaining at least two binding-point grayscale values, wherein after the step of determining the relative compensation brightness parameter corresponding to the binding-point grayscale value according to the initial-state control parameter, the initial-state brightness parameters, and the reference brightness parameter corresponding to each binding-point grayscale value, the control method of the display panel includes:

determining the relative compensation brightness parameter corresponding to each of the binding-point grayscale values according to the relative compensation brightness parameter corresponding to each of the binding-point grayscale values, and determining a plurality of relative compensation brightness parameters corresponding to a plurality of non-binding-point grayscale values, wherein two of the binding-point grayscale values comprise at least one of the non-binding-point grayscale values.

In one embodiment, after the step of determining the relative compensation brightness parameter corresponding to the binding-point grayscale value according to the initial-state control parameter, the initial-state brightness parameters, and the reference brightness parameter corresponding to each binding-point grayscale value, the control method of the display panel includes:

obtaining a relative parameter of a hopping region, wherein a plurality of data lines are shared in the hopping region and the to-be-regulated region; and determining an absolute compensation brightness parameter corresponding to the binding-point grayscale value according to the relative parameter and the relative compensation brightness parameter and on a basis of an absolute parameter.

The present invention provides a display device. The display device includes a controller and a storage appliance. The controller is configured to execute various instructions stored in the storage appliance to realize the control method of the display panel mentioned above.

The present invention provides a control method of a display panel and a display device. The method includes: obtaining at least one binding-point grayscale value; determining an initial-state control parameter, an initial-state brightness parameter, and a reference brightness parameter corresponding to to-be-regulated regions according to each of the binding-point grayscale value; judging whether a ratio of the initial-state brightness parameter to the reference brightness parameter corresponding to each binding-point grayscale value is within a preset range; and determining a relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range. This solution aims at the binding-point grayscale values that the ratio of the initial-state brightness parameters to the corresponding reference brightness parameter is not within the preset range. The relative compensation brightness parameter of the binding-point grayscale value is determined according to the initial-state control parameter, the initial-state brightness parameter, and the reference brightness parameter, so that compensation is performed according to the corresponding relative compensation brightness parameter when images are displayed. This method can remedy the crosstalk phenomenon in the display panel, which improves quality of the displayed images.

BRIEF DESCRIPTION OF THE SEVERAL VIEWS OF THE DRAWINGS

The technical solutions and other advantageous effects of the present application will be apparent with reference to the following accompanying drawings and detailed description of embodiments of the present application.

DESCRIPTION OF SPECIFIC EMBODIMENTS OF THE INVENTION

The technical solutions in the embodiments of the present invention are clearly and completely described in the following with reference to the accompanying drawings in the embodiments of the present invention. Obviously, the described embodiments are only part of the embodiments of the present invention, but are not all embodiments of the present invention. All other embodiments obtained by those skilled in the art based on the embodiments of the present invention without creative efforts are within the scope of the present invention.

In the description of the present invention, it should be understood that the orientation or positional relation indicated by the terms "correspondingly", "upper", "lower", etc. is based on the orientation or positional relation shown in the accompanying figures. The aforesaid orientation or positional relation is merely for the convenience for describing of the present invention and for the simplification of the description, and is not intended to indicate or imply that the indicated devices or elements have a specific orientation or is constructed and operated in a specific orientation. Therefore, it should not be understood as a limitation on the present invention. Moreover, the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly. In the description of the present invention, the meaning of "a plurality" is two or more unless clearly and specifically defined otherwise. "Electrically connected to" indicates that there is conduction between the two, and it is not limited to direct or indirect connection. In addition, it should be noted that the accompanying drawings provide only the structures that are closely related to the present invention, and some details that are not relevant to the present invention are omitted, which purpose is to simplify the drawings and make the points of invention clear at a glance. Namely, the device in practice are not exactly the same as the drawings, so the drawings do not act as the limitations of device and/or method.

The present invention provides a control method of a display panel. The method includes but is not limited to the following embodiments and combinations of the following embodiments.

Figure 1:
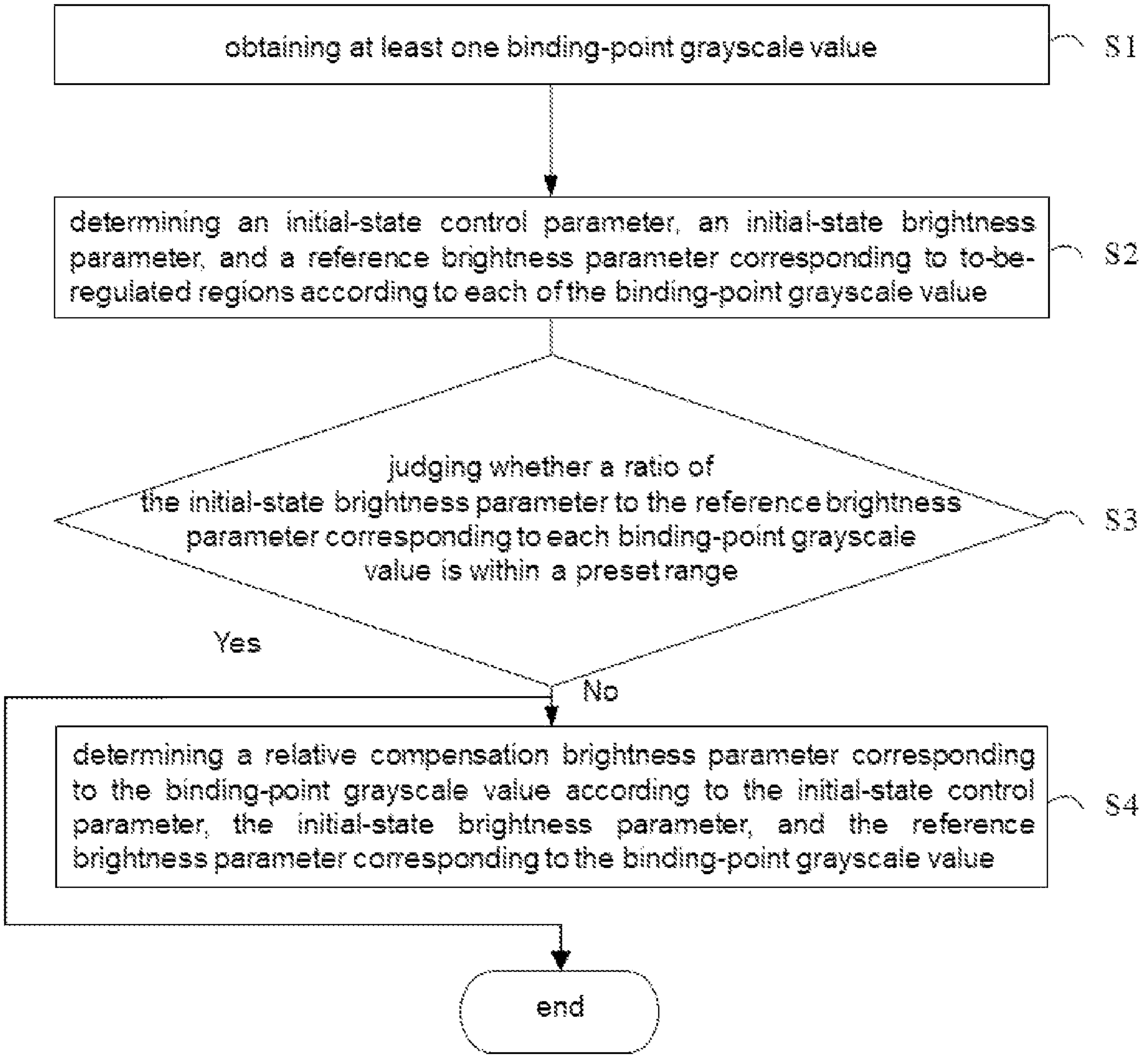
FIG. 1 is a flowchart of one embodiment of a control method of a display panel provided by one embodiment of the present invention.

In one embodiment, as illustrated in FIG. 1, the control method of the display panel includes but is not limited to the following steps.

S1: obtaining at least one binding-point grayscale value.

Wherein, the display panel can be a liquid crystal display panel. It can be understood that the display panel includes a plurality of sub-pixels. A plurality of liquid crystal molecules corresponding to each of the sub-pixels can be deflected with different amplitudes under different voltage differences to transmit different amounts of light, and then filters are combined to present dot images with different chromaticity and different brightness. Wherein, before the dot images presented by each of the sub-pixels in the display panel pass through the corresponding filters, theoretically, grayscale images of 256 levels from 0 to 255 can be presented. Specifically, when one voltage difference is applied to two ends of the plurality of liquid crystal molecules corresponding to one of the sub-pixels, theoretically, the dot images presented by the sub-pixels have corresponding grayscale values before passing through the corresponding filter. Furthermore, pixel units include the plurality of sub-pixels. When equal voltage differences are applied to two ends of the plurality of liquid crystal molecules corresponding to each of the sub-pixels in the pixel units, the pixel units can display grayscale images. Furthermore, the grayscale values of the grayscale images displayed by the pixel units can be equal to the dot image presented by any one of the sub-pixels having the corresponding grayscale value before passing through the corresponding filter.

Specifically, the 256 grayscale values corresponding to the gray-scale images of the 256 levels can include a plurality of binding-point grayscale values. For example, the plurality of binding-point grayscale values can include but are not limited to 32, 64, 96, 128, 160, 192, and 224. It can be understood that a difference between two adjacent binding-point grayscale values can be equal to ensure that the binding-point grayscale values can be evenly distributed among the 256 grayscale values. Furthermore, the 256 grayscale values can be further divided to obtain more binding-point grayscale values on the basis of the aforesaid 7 binding-point grayscale values. For example, the plurality of binding-point grayscale values can include but are not limited to 16, 32, 48, 64, 80, 96, 112, 128, 144, 160, 176, 192, 208, and 224. Of course, the number of the binding-point grayscale values can be selected according to accuracy requirements of the control method of the display panel.

S2: determining an initial-state control parameter, an initial-state brightness parameter, and a reference brightness parameter corresponding to to-be-regulated regions according to each of the binding-point grayscale value.

Wherein, the to-be-regulated region is a region where a vertical crosstalk phenomenon exists in the display panel. Specifically, the display panel can include a plurality of gate lines disposed parallelly along a longitudinal direction and a plurality of data lines disposed parallelly along a transverse direction. Each of the data lines and one corresponding data line can define one pixel region. Corresponding pixel electrodes are disposed in the pixel region. It can be understood that when a voltage signal transmitted on each of the data lines changes, coupling capacitor is generated between a pixel electrode on a left side of the data lines, a pixel electrode on a right side of the data line, and the data lines, which allows the voltage on the two corresponding pixel electrodes to change, resulting in brightness of the corresponding two sub-pixels being changed, thereby causing the vertical crosstalk phenomenon.

Figure 2:
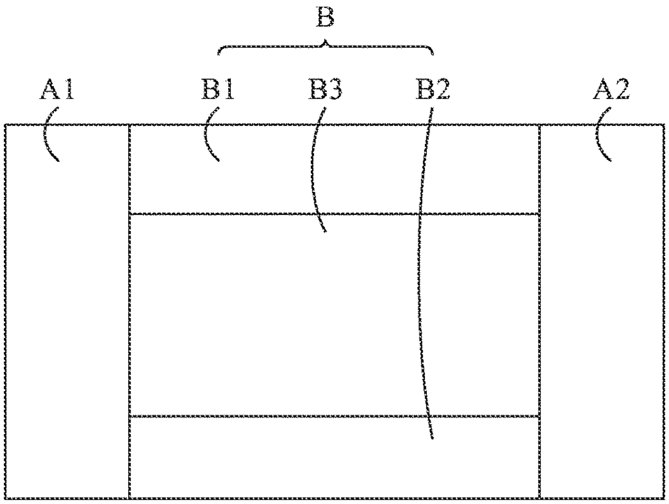
FIG. 2 is a schematic diagram of regional division of the display panel provided by one embodiment of the present invention.

Specifically, as illustrated in FIG. 2, the display panel includes a region A1 on a left side, a region A2 on a right side, and a region B located between the region A1 and the region A2; and the region B includes a region B1 on an upper side, a region B2 on a lower side, and a region B3 located between the region B1 and the region B2. It should be noted that within a certain period of time, if same data voltages are input to the region A1 and the region A2, because the data voltages on each data line in the region A1 and the region A2 do not change, there will be no vertical crosstalk phenomenon in the region A1 and the region A2, i.e., the same images can be displayed in region A1 and the region A2. Meanwhile, if the data voltages same as those inputted in the region A1 and the region A2 are inputted to the region 131 and the region B2, and a data voltage different from that inputted to the region 131 is inputted to the region B3, because the data voltages on each data line change in one frame, and they also change in different frames, the vertical crosstalk phenomenon exists in the region 131 and the region B2, which allows displayed images in the region 131 and the region B2 to be different from displayed images in the region A1 and the region A2. Therefore, the to-be-regulated regions can include at least one of the region 131 or the region B2 in FIG. 2.

It could be understood that the grayscale images of the four regions of the region A1, the region A2, the region B1, and the region B2 are taken as an example for description herein, i.e., the plurality of sub-pixels in each pixel unit in the to-be-regulated region can correspond to one same grayscale value before they pass through the corresponding filter. It should be noted that there is the corresponding initial-state control parameter for each of the binding-point grayscale values in the to-be-adjusted region, and the initial-state control parameter can include but is not limited to a voltage difference value, or charging duration. It could be understood that when the charging duration is constant, and the voltage difference corresponding to the plurality of liquid crystal molecules corresponding to each of the sub-pixels in one of the pixel units in the to-be-regulated region are configured to be one same voltage difference value, the grayscale values of the grayscale images displayed by the pixel unit can be equal to the binding-point grayscale values; and when the voltage difference applied to the plurality of liquid crystal molecules is constant, and the duration of the voltage difference applied to the plurality of liquid crystal molecules corresponding to each of the sub-pixels in one of the pixel units in the to-be-regulated region is configured as the charging duration, the grayscale values of the grayscale images displayed by the pixel unit can be equal to the binding-point grayscale values.

In one embodiment, the step of determining the corresponding initial-state brightness parameter according to each binding-point grayscale value includes but is not limited to the following step:

S201: determining the corresponding initial-state control parameter according to the binding-point grayscale value, regulating the to-be-regulated region according to the initial-state control parameter, and obtaining a regulated brightness value of the to-be-regulated region for inclusion in the corresponding initial-state brightness parameter.

Wherein, each of the binding-point grayscale values has the corresponding initial-state control parameter. According to the above analysis, each of the binding-point grayscale values can have at least one of the corresponding voltage difference or the charging duration. Specifically, each of the binding-point grayscale values and the corresponding initial-state control parameter can be stored in the display panel in advance, and at here, the initial-state control parameters corresponding to the binding-point grayscale values can be obtained from the display panel. Specifically, each of the sub-pixels in each of the pixel units in the to-be-regulated region can be controlled according to the initial-state control parameters, which allows at least one of the voltage differences applied to the two ends of the multiple liquid crystal molecules corresponding to each of the sub-pixels in the to-be-regulated region to be equal to one of voltage difference values, or the duration of the voltage difference applied to the two ends of the plurality of liquid crystal molecules corresponding to each of the sub-pixels in the to-be-regulated region to be maintained as the charging duration is established. Theoretically, it can be understood that the grayscale values of the grayscale images displayed by each of the pixel units in the to-be-regulated region under the control of the initial-state control parameters are equal to the binding-point grayscale values.

Furthermore, a regulated brightness value of the to-be-regulated region can be equal to brightness of the grayscale images comprehensively displayed by the plurality of pixel units in the to-be-regulated regions. It can be understood that the adjusted brightness value of the to-be-regulated region is determined by the initial-state brightness parameters and vertical crosstalk together, i.e., the initial-state brightness parameters include factors related to the vertical crosstalk.

Wherein, the regulated brightness value of the to-be-regulated region is allowed to be determined after being photographed by a camera and through analysis. Specifically, the adjusted brightness value of the entire to-be-regulated region can be obtained to act as one of the initial-state brightness parameters, the adjusted brightness value of a center position of the to-be-regulated region can also be obtained to act as one of the initial-state brightness parameters, and an average value of the adjusted brightness values of the plurality of pixel units of numerical value curves at a center position of the to-be-regulated region to act as one of the initial-state brightness parameters.

In one embodiment, the step of determining the corresponding initial-state brightness parameter according to each binding-point grayscale value further includes but is not limited to the following step:

S202: determining the corresponding initial-state control parameter according to the binding-point grayscale value, regulating the to-be-regulated region according to the initial-state control parameter, and obtaining a regulated color coordinate of the to-be-regulated region for inclusion in the corresponding initial-state brightness parameter.

From the above description, each of the sub-pixels in each of the pixel units in the to-be-regulated region can be controlled according to the initial-state control parameters; the regulated color coordinate of the to-be-regulated region can be equal to the color coordinate of the grayscale images comprehensively displayed by the plurality of pixel units in the to-be-regulated region. It can be understood that the adjusted color coordinate of the to-be-regulated region is determined by the initial-state brightness parameters and vertical crosstalk together, and the initial-state brightness parameters include factors related to the vertical crosstalk. Wherein, the adjusted color coordinate of the to-be-regulated region can be determined by using instruments such as a color analyzer, a spectroradiometer, etc. Specifically, the adjusted color coordinate of the entire to-be-regulated region can be obtained to act as one of the initial-state brightness parameters, or the adjusted color coordinate of the center position of the to-be-regulated region can also be obtained to act as one of the initial-state brightness parameters, or an average value of the adjusted color coordinate of the plurality of pixel units of numerical value curves at the center position of the to-be-regulated region to act as one of the initial-state brightness parameters.

It should be noted that the color coordinate can be in a form of (x,y). Wherein, x, y are a horizontal axis value and a vertical axis value respectively. The average values of the plurality of color coordinates can be in a form of (x1,y1). Wherein, x1 can be an average value of the plurality of horizontal axis values of the plurality of color coordinates, and y1 can be an average value of the plurality of vertical axis values of the plurality of color coordinates.

In summary, the initial-state brightness parameters are determined by the initial-state brightness parameters and vertical crosstalk together, i.e., the initial-state brightness parameters include factors related to the vertical crosstalk.

In one embodiment, the step of determining the corresponding initial-state brightness parameter according to each binding-point grayscale value includes but is not limited to the following step:

S203: determining the corresponding initial-state control parameter according to the binding-point grayscale value, regulating a reference region according to the initial-state control parameter, and obtaining a regulated brightness value of the reference region for inclusion in the corresponding reference brightness parameter, wherein a vertical crosstalk phenomenon in the reference region is weaker than a vertical crosstalk phenomenon in the to-be-regulated region.

It can be understood that because the vertical crosstalk phenomenon in the reference region is weaker than the vertical crosstalk phenomenon in the to-be-regulated region (i.e., it can be understood that a factor of the initial-state brightness parameters affected the vertical crosstalk is relatively great, while a factor of the reference brightness parameters affected by the vertical crosstalk is relatively small), the initial-state brightness parameters and the reference brightness parameters can be used to determine parameters related to the factors of the vertical crosstalk. Furthermore, in order to better determine the parameters related to the factors of the vertical crosstalk, the reference region can be selected as a region where there is no vertical crosstalk phenomenon. For example, the reference region can include at least one of the region A1 or the region A2 in FIG. 2.

Similarly, each of the sub-pixels in each of the pixel units in the reference region can be controlled according to the initial-state control parameters. Theoretically, the grayscale values of the grayscale images displayed by each of the pixel units in the reference region under the control of the initial-state control parameters are equal to the binding-point grayscale values. A regulated brightness value of the reference region can be equal to brightness of the grayscale images comprehensively displayed by the plurality of pixel units in the reference region. The regulated brightness value of the reference region is determined by the initial-state brightness parameters, i.e., the initial-state brightness parameters do not include factors related to the vertical crosstalk. Wherein, a method for obtaining the regulated brightness value of the reference region can refer to the method for obtaining the regulated brightness value of the to-be-regulated region hereinabove.

Of course, on the basis of the step S202, the step of determining the corresponding initial-state brightness parameter according to each binding-point grayscale value further includes but is not limited to the following step:

S204: determining the corresponding initial-state control parameter according to the binding-point grayscale value, regulating the reference region according to the initial-state control parameter, and obtaining a regulated color coordinate of the reference region for inclusion in the corresponding reference brightness parameter.

Similarly, each of the sub-pixels in each of the pixel units in the reference region can be controlled according to the initial-state control parameters. Theoretically, the grayscale values of the grayscale images displayed by each of the pixel units in the reference region under the control of the initial-state control parameters are equal to the binding-point grayscale values. The regulated color coordinate of the reference region can be equal to the color coordinate of the grayscale images comprehensively displayed by the plurality of pixel units in the reference region. The regulated color coordinate of the reference region is determined by the initial-state brightness parameters, i.e., the initial-state brightness parameters do not include factors related to the vertical crosstalk. Wherein, a method for obtaining the regulated color coordinate of the reference region can refer to the method for obtaining the regulated color coordinate of the to-be-regulated region hereinabove.

S3: judging whether a ratio of the initial-state brightness parameter to the reference brightness parameter corresponding to each binding-point grayscale value is within a preset range.

According to the above analysis, when the vertical crosstalk phenomenon does not exist in the reference region, the initial-state brightness parameters can be understood to be affected by the factor of the vertical crosstalk, while the reference brightness parameters can be understood not to be affected by the factor of the vertical crosstalk. Therefore, the initial-state brightness parameters and the reference brightness parameters can be used to determine parameters related to the factors of the vertical crosstalk. It can be understood that the closer the ratio of the initial-state brightness parameter to the corresponding reference brightness parameter is to 1, the less the initial-state brightness parameter is affected by vertical crosstalk factors, i.e., the weaker the vertical crosstalk phenomenon in the to-be-regulated region is. In contrast, the farther the ratio of the initial-state brightness parameter to the corresponding reference brightness parameter is from 1, the stronger the initial-state brightness parameter affected by vertical crosstalk factors is, and the more necessary it is to perform compensation in the to-be-regulated region.

In summary, the preset range can be understood as an interval range including 1. Furthermore, an intermediate value of the preset range can be 1, and the preset range can be configured according to an accuracy requirement. For example, when the accuracy requirement is high, an interval of the preset range can be configured to be relatively narrow, otherwise, the interval of the preset range can be configured to be relatively wide.

S4: determining a relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range.

According to the above analysis, the farther the ratio of the initial-state brightness parameter to the corresponding reference brightness parameter is from 1, the stronger the vertical crosstalk in the to-be-regulated region is, and the more compensation is performed in the to-be-regulated region. Furthermore, the intermediate value of the preset range can be 1, i.e., when the ratio of the initial-state brightness parameter to the reference brightness parameter corresponding to the at least one binding-point grayscale value is not within the preset range, compensation needs to be performed in the to-be-regulated region.

It can be understood that the difference between the initial-state brightness parameters and the reference brightness parameters reflects intensity of the vertical crosstalk phenomenon. Furthermore, compensation of the compensation value can be performed based on the corresponding initial-state control parameter, i.e., each of the binding-point grayscale values can have the corresponding relative compensation brightness parameter.

It should be noted that when the initial-state brightness parameters only include the regulated brightness values of the to-be-regulated region, the ratio of the initial-state brightness parameter to the reference brightness parameter can be the ratio of the regulated brightness value of the to-be-regulated region to the regulated brightness value of the reference region; when the initial-state brightness parameters include the brightness value and the regulated color coordinate of the to-be-regulated region, the ratio of the initial-state brightness parameter to the reference brightness parameter can include the ratio of the regulated brightness value of the to-be-regulated region to the regulated brightness value of the reference region, a ratio of the horizontal axis value of the regulated color coordinate of the to-be-regulated region to the horizontal axis value of the regulated color coordinate of the reference region, and a ratio of the vertical axis value of the regulated color coordinate of the to-be-regulated region to the vertical axis value of the regulated color coordinate of the reference region. Furthermore, each of the ratios can have the corresponding preset range, i.e., when any one of the aforesaid three ratios is not within the corresponding preset range, determining the relative compensation brightness parameter corresponding to the binding-point grayscale value is needed.

Figure 3:
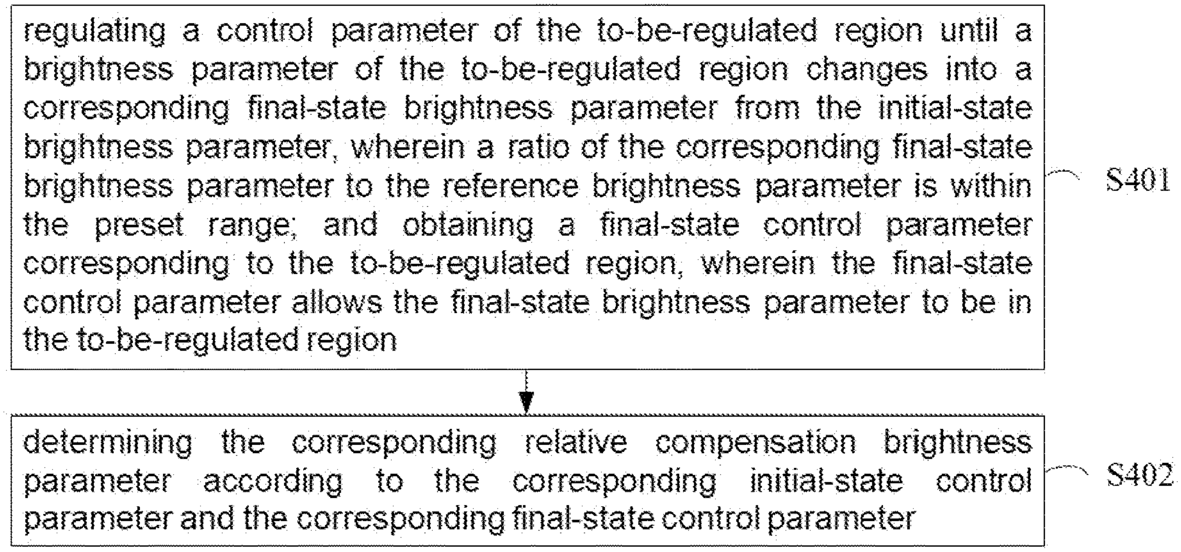
FIG. 3 is a flowchart of another embodiment of the control method of the display panel provided by one embodiment of the present invention.

In one embodiment, as illustrated in FIG. 3, determining the relative compensation brightness parameter corresponding to the binding-point grayscale value according to the initial-state control parameter, the initial-state brightness parameters, and the reference brightness parameter corresponding to each binding-point grayscale value, the control method of the display panel includes but is not limited to the following step:

S401: regulating a control parameter of the to-be-regulated region until a brightness parameter of the to-be-regulated region changes into a corresponding final-state brightness parameter from the initial-state brightness parameter, wherein a ratio of the corresponding final-state brightness parameter to the reference brightness parameter is within the preset range; and obtaining a final-state control parameter corresponding to the to-be-regulated region, wherein the final-state control parameter allows the final-state brightness parameter to be in the to-be-regulated region.

It can be understood that the step S401 can be understood as adjusting the control parameter of the to-be-regulated region from the initial-state control parameter to the final-state control parameter. Correspondingly, the brightness parameter of the to-be-regulated region changes from the initial-state brightness parameter to the final-state brightness parameter. Wherein, the final-state control parameter can refer to above related description about the initial-state control parameter, and the final-state brightness parameter can refer to above related description about the initial-state brightness parameter. It should be noted that members of the final-state brightness parameters can be consistent with members of the initial-state brightness parameters.

With reference to the analysis above, when the control parameter of the to-be-regulated region is the final-state control parameter, the brightness parameter of the to-be-regulated region is the final-state brightness parameter. Specifically, the control parameter of the to-be-regulated region can be regulated while using relevant instruments to obtain the real-time brightness parameter until the ratio of the brightness parameter to the corresponding reference brightness parameter is within the preset range, and the brightness parameter of at this time is selected as the final-state brightness parameter. It should be noted that because the preset range includes an infinite number of values, i.e., theoretically, there can be an infinite number of values for the final-state brightness parameter, hence, one of the values can be selected as the final-state brightness parameter at here.

It should be noted that when the initial-state brightness parameter includes the brightness value and the regulated color coordinate of the to-be-regulated region, the ratio of the final-state brightness parameter to the corresponding reference brightness parameter can include the ratio of the corresponding brightness value of the to-be-regulated region to the corresponding brightness value of the reference region, the ratio of the corresponding horizontal axis value of the color coordinate of the to-be-regulated region to the corresponding horizontal axis value of the color coordinate of the reference region, and the ratio of the corresponding vertical axis value of the color coordinate of the to-be-regulated region to the corresponding vertical axis value of the color coordinate of the reference region. Furthermore, when the aforesaid three ratios are within the corresponding preset range, the ratio of the corresponding final-state brightness parameter to the corresponding reference brightness parameter being within the preset range is satisfied.

S402: determining the corresponding relative compensation brightness parameter according to the corresponding initial-state control parameter and the corresponding final-state control parameter.

According to the above analysis, it can be understood that before the step S401 is executed, the ratio of the initial-state brightness parameter to the reference brightness parameter corresponding to the at least one binding-point grayscale value is not within the preset range. Furthermore, the ratio of the corresponding final-state brightness parameter to the reference brightness parameter being within the preset range can be realized in the step S401, i.e., difference between the final-state brightness parameter and the initial-state control parameter is the reason of solving the vertical crosstalk phenomenon in the to-be-regulated region. Therefore, the relative compensation brightness parameter can be the difference between the final-state brightness parameter and the initial-state control parameter. Specifically, the relative compensation brightness parameter can be an absolute value of the difference value or an absolute value of the ratio of the final-state brightness parameter to the initial-state control parameter.

In one embodiment, after the step of judging whether the ratio of the initial-state brightness parameter to the reference brightness parameter corresponding to each binding-point grayscale value is within the preset range, the control method of the display panel includes:

S5: using 0 as the relative compensation brightness parameter corresponding to the binding-point grayscale value when the ratio of the initial-state brightness parameter to the reference brightness parameter corresponding to the at least one binding-point grayscale value is within the preset range.

It can be understood that when the ratio of the initial-state brightness parameter to the reference brightness parameter corresponding to the at least one binding-point grayscale value is within the preset range, this indicates the ratio of the initial-state brightness parameter corresponding to the binding-point grayscale value to the corresponding reference brightness parameter is close to 1, i.e., the vertical crosstalk phenomenon in the to-be-regulated region is weaker. Moreover, the vertical crosstalk phenomenon in the to-be-regulated region at the binding-point grayscale value can even be ignored, i.e., the relative compensation brightness parameter corresponding to the binding-point grayscale value can be 0.

In one embodiment, the step of obtaining the at least one binding-point grayscale value includes but is not limited to the following step:

S101: obtaining at least two binding-point grayscale values.

It should be noted that the plurality of the binding-point grayscale values can includes but are not limited to 32, 64, 96, 128, 160, 192, 224 according to the step S1, and at least two values thereof can be obtained to act as two of the binding-point grayscale values. It can be understood that the plurality of binding-point grayscale values should be evenly distributed among the 256 grayscale values.

Figure 4:
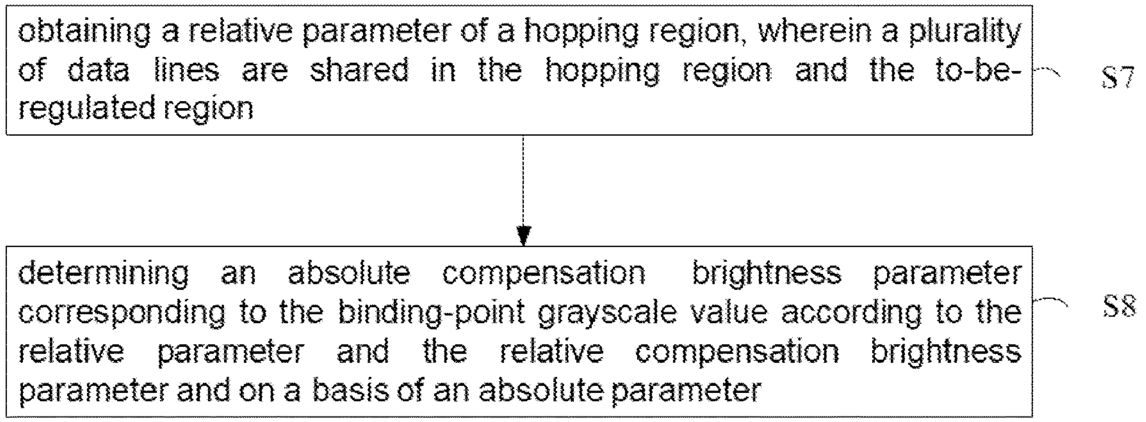
FIG. 4 is a flowchart of yet another embodiment of the control method of the display panel provided by one embodiment of the present invention.

Furthermore, on the basis of the step S101, as illustrated in FIG. 4, after the step of determining the relative compensation brightness parameter corresponding to the binding-point grayscale value according to the initial-state control parameter, the initial-state brightness parameters, and the reference brightness parameter corresponding to each binding-point grayscale value, the control method of the display panel includes but is not limited to the following step:

S6: determining the relative compensation brightness parameter corresponding to each of the binding-point grayscale values according to the relative compensation brightness parameter corresponding to each of the binding-point grayscale values, and determining a plurality of relative compensation brightness parameters corresponding to a plurality of non-binding-point grayscale values, wherein two of the binding-point grayscale values comprise at least one of the non-binding-point grayscale values.

It can be understood that the corresponding relative compensation brightness parameter corresponding to each of the binding-point grayscale values can be determined in the step S4 and the step S5. Furthermore, the plurality of relative compensation brightness parameters of the plurality of non-binding-point grayscale values between the two adjacent binding-point grayscale values can be determined according to two of the relative compensation brightness parameters corresponding to two of the binding-point grayscale values. Specifically, the relative compensation brightness parameter corresponding to each of the non-binding-point grayscale values can be determined by a linear interpolation method. For example, when the relative compensation brightness parameters corresponding to the two adjacent binding-point grayscale values of 32 and 64 are m and n, the relative compensation brightness parameters corresponding to the binding-point grayscale values of 48 and 40 are respectively (m+n)/2 and (3*m+n)/4. Furthermore, the 256 grayscale values include the plurality of binding-point grayscale values and the plurality of non-binding-point grayscale values, and the 256 relative compensation brightness parameters corresponding to the 256 grayscale values can be determined by the step S6.

In one embodiment, as illustrated in FIG. 4, after the step of determining the relative compensation brightness parameter corresponding to the binding-point grayscale value according to the initial-state control parameter, the initial-state brightness parameters, and the reference brightness parameter corresponding to each binding-point grayscale value, the control method of the display panel includes but is not limited to the following step.

S7: obtaining a relative parameter of a hopping region, wherein a plurality of data lines are shared in the hopping region and the to-be-regulated region.

It can be understood that the hopping region can be the region B3 as illustrated in FIG. 2. Because the data voltage inputted to the hopping region (the region B3) is different from the data voltage of the to-be-regulated region (the region B1, the region B2), when the display panel displays static images, the data voltage of the plurality of data lines located in the region B change both in one same frame and two adjacent frames. Furthermore, a magnitude of the change can affect the intensity of the vertical crosstalk phenomenon in the to-be-regulated region, i.e., the difference of the data voltages in the hopping region and the to-be-regulated region can affect the intensity of the vertical crosstalk phenomenon of the to-be-regulated region.

Specifically, when the grayscale images displayed in the hopping region are constant, the plurality of relative compensation brightness parameter corresponding to the plurality of binding-point grayscale values in the to-be-regulated region allow to be determined. Therefore, determination of the plurality of the relative compensation brightness parameters corresponds to a situation of the grayscale images displayed in the hopping region. Wherein, the relative parameter relates to the grayscale images displayed in the hopping region. For example, the relative parameter can include at least one of a grayscale value p of the grayscale images displayed in the hopping region, a voltage difference value Vp corresponding to the grayscale value, and a charging duration Tp.

S8: determining an absolute compensation brightness parameter corresponding to the binding-point grayscale value according to the relative parameter and the relative compensation brightness parameter and on a basis of an absolute parameter.

According to the above analysis, it can be understood that the determination of the plurality of the relative compensation brightness parameters depends on the grayscale images displayed in the hopping region. However, when the images are actually displayed, the grayscale images displayed in the hopping region are uncertain, or the magnitude of the change of the data voltage on each data line in the region B is not determined. That is, aiming at any of the binding-point grayscale values, a relation between the absolute parameter and the corresponding absolute compensation brightness parameter is allowed to be determined according to a relation between the relative parameter and the corresponding relative compensation brightness parameter. Then, the corresponding absolute compensation brightness parameter is determined on the basis of the absolute parameter. Specifically, the relation between the relative parameter and the corresponding relative compensation brightness parameter can be the relation between the absolute parameter and the absolute compensation brightness parameter.

It should be understood that the control method of the display panel in the present invention can obtain different compensative brightness parameters corresponding to each grayscale value under different grayscale value of hopping amount. Furthermore, when the display panel displays images, for example, a first pixel unit and a second pixel unit are disposed adjacently on an upper side and a lower side of one of the data lines, and the data signal sequentially passes through the first pixel unit and the second pixel unit. Furthermore, theoretically, the corresponding grayscale values of the grayscale images displayed by the first pixel unit and the second pixel unit are a first grayscale value p1 and a second grayscale value p2, and then the first grayscale value p1 can be equivalent to the absolute parameters mentioned above, and the second grayscale value p2 can be equivalent to the binding-point grayscale value or the non-binding-point grayscale value mentioned above. According to the second grayscale value p2, and the corresponding relation between the relative parameter and the relative compensation brightness parameter mentioned above, and on the basis of the first grayscale value p1, the absolute compensation brightness parameter corresponding to the second grayscale value p2 can be determined.

Figure 5:
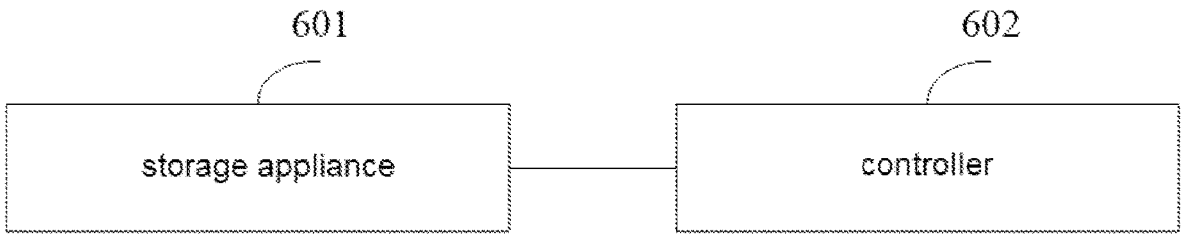
FIG. 5 is a structural schematic diagram of a controller and a storage appliance in the display panel provided by one embodiment of the present invention.

The present invention further provides a display device. As illustrated in FIG. 5, the display device includes a controller 602 and a storage appliance 601. The controller 602 is configured to execute various instructions stored in the storage appliance 601 to realize the control method of the display panel mentioned above.

The storage appliance 601 can be configured to store software programs and modules, and it mainly includes a program storage region and a data storage region. The controller 602 executes the software programs and the modules stored in the storage appliance 601 to execute various functional applications and to data process.

The controller 602 executes various functions and processes data by operating or executing at least one of the software programs or modules stored in the storage appliance 601 and calling the data stored in the storage appliance 601, thereby performing overall monitor.

In some embodiments, the controller 602 obtains at least one binding-point grayscale value.

In some embodiments, the controller 602 determines an initial-state control parameter, an initial-state brightness parameter, and a reference brightness parameter corresponding to to-be-regulated regions according to each of the binding-point grayscale value.

Specifically, the controller 602 determines the corresponding initial-state control parameter according to the binding-point grayscale value, regulating the to-be-regulated region according to the initial-state control parameter, and obtaining a regulated brightness value of the to-be-regulated region for inclusion in the corresponding initial-state brightness parameter.

Specifically, the controller 602 determines the corresponding initial-state control parameter according to the binding-point grayscale value, regulating a reference region according to the initial-state control parameter, and obtaining a regulated brightness value of the reference region for inclusion in the corresponding reference brightness parameter, wherein a vertical crosstalk phenomenon in the reference region is weaker than a vertical crosstalk phenomenon in the to-be-regulated region.

Specifically, the controller 602 determines the corresponding initial-state control parameter according to the binding-point grayscale value, regulating the to-be-regulated region according to the initial-state control parameter, and obtaining a regulated color coordinate of the to-be-regulated region for inclusion in the corresponding initial-state brightness parameter.

In some embodiments, the controller 602 judges whether a ratio of the initial-state brightness parameter to the reference brightness parameter corresponding to each binding-point grayscale value is within a preset range.

In some embodiments, when the ratio of the initial-state brightness parameter to the reference brightness parameter corresponding to the at least one binding-point grayscale value is within the preset range, the controller 602 determines the relative compensation brightness parameter corresponding to the binding-point grayscale value according to the initial-state control parameter, the initial-state brightness parameters, and the reference brightness parameter corresponding to each binding-point grayscale value.

Specifically, the controller 602 regulates a control parameter of the to-be-regulated region until a brightness parameter of the to-be-regulated region changes into a corresponding final-state brightness parameter from the initial-state brightness parameter, wherein a ratio of the corresponding final-state brightness parameter to the reference brightness parameter is within the preset range; the controller 602 obtains a final-state control parameter corresponding to the to-be-regulated region, wherein the final-state control parameter allows the final-state brightness parameter to be in the to-be-regulated region; and the controller 602 determines the corresponding relative compensation brightness parameter according to the corresponding initial-state control parameter and the corresponding final-state control parameter.

Specifically, the controller 602 uses 0 as the relative compensation brightness parameter corresponding to the binding-point grayscale value when the ratio of the initial-state brightness parameter to the reference brightness parameter corresponding to the at least one binding-point grayscale value is within the preset range.

Specifically, the controller 602 obtains at least two binding-point grayscale values; and the controller 602 determines the relative compensation brightness parameter corresponding to each of the binding-point grayscale values according to the relative compensation brightness parameter corresponding to each of the binding-point grayscale values, and determining a plurality of relative compensation brightness parameters corresponding to a plurality of non-binding-point grayscale values, wherein two of the binding-point grayscale values comprise at least one of the non-binding-point grayscale values.

Specifically, the controller 602 obtains a relative parameter of a hopping region, wherein a plurality of data lines are shared in the hopping region and the to-be-regulated region; and the controller 602 determines an absolute compensation brightness parameter corresponding to the binding-point grayscale value according to the relative parameter and the relative compensation brightness parameter and on a basis of an absolute parameter.

The present invention provides the control method of the display panel and the display device. The method includes: obtaining the at least one binding-point grayscale value; determining the initial-state control parameter, the initial-state brightness parameter, and the reference brightness parameter corresponding to the to-be-regulated regions according to each of the binding-point grayscale value; judging whether the ratio of the initial-state brightness parameter to the reference brightness parameter corresponding to each binding-point grayscale value is within the preset range; and determining the relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range. This solution aims at the binding-point grayscale values that the ratio of the initial-state brightness parameters to the corresponding reference brightness parameter is not within the preset range. The relative compensation brightness parameter of the binding-point grayscale value is determined according to the initial-state control parameter, the initial-state brightness parameter, and the reference brightness parameter, so that compensation is performed according to the corresponding relative compensation brightness parameter when images are displayed. This method can remedy the crosstalk phenomenon in the display panel, which improves quality of the display screens.

The control method and the display panel provided by the embodiments of present invention are described in detail above. This article uses specific cases for describing the principles and the embodiments of the present invention, and the description of the embodiments mentioned above is only for helping to understand the method and the core idea of the present invention. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present invention.

What is claimed is:

1. A control method of a display panel, comprising:

obtaining at least one binding-point grayscale value;

determining an initial-state control parameter, an initial-state brightness parameter, and a reference brightness parameter corresponding to to-be-regulated regions according to each of the binding-point grayscale value;

judging whether a ratio of the initial-state brightness parameter to the reference brightness parameter corresponding to each binding-point grayscale value is within a preset range;

determining a relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range;

using 0 as the relative compensation brightness parameter corresponding to the binding-point grayscale value when the ratio of the initial-state brightness parameter to the reference brightness parameter corresponding to the at least one binding-point grayscale value is within the preset range;

obtaining a relative parameter of a hopping region, wherein a plurality of data lines are shared in the hopping region and the to-be-regulated region; and determining an absolute compensation brightness parameter corresponding to the binding-point grayscale value according to the relative parameter and the relative compensation brightness parameter and on a basis of an absolute parameter.

2. The control method of the display panel as claimed in claim 1, wherein determining the corresponding initial-state brightness parameter according to each binding-point grayscale value comprises:

determining the corresponding initial-state control parameter according to the binding-point grayscale value, regulating the to-be-regulated region according to the initial-state control parameter, and obtaining a regulated brightness value of the to-be-regulated region for inclusion in the corresponding initial-state brightness parameter.

3. The control method of the display panel as claimed in claim 2, wherein determining the corresponding initial-state brightness parameter according to each binding-point grayscale value further comprises:

regulating a reference region according to the initial-state control parameter, and obtaining a regulated brightness value of the reference region for inclusion in the corresponding reference brightness parameter, wherein a vertical crosstalk phenomenon in the reference region is weaker than a vertical crosstalk phenomenon in the to-be-regulated region.

4. The control method of the display panel as claimed in claim 2, wherein determining the corresponding initial-state brightness parameter according to each binding-point grayscale value further comprises:

obtaining a regulated color coordinate of the to-be-regulated region for inclusion in the corresponding initial-state brightness parameter.

5. The control method of the display panel as claimed in claim 2, wherein determining the relative compensation brightness parameter corresponding to the binding-point grayscale value according to the initial-state control parameter, the initial-state brightness parameters, and the reference brightness parameter corresponding to each binding-point grayscale value comprises:

regulating a control parameter of the to-be-regulated region until a brightness parameter of the to-be-regulated region changes into a corresponding final-state brightness parameter from the initial-state brightness parameter, wherein a ratio of the corresponding final-state brightness parameter to the reference brightness parameter is within the preset range; obtaining a final-state control parameter corresponding to the to-be-regulated region, wherein the final-state control parameter allows the final-state brightness parameter to be in the to-be-regulated region; and determining the corresponding relative compensation brightness parameter according to the corresponding initial-state control parameter and the corresponding final-state control parameter.

6. The control method of the display panel as claimed in claim 1, wherein obtaining the at least one binding-point grayscale value comprises:

obtaining at least two binding-point grayscale values, wherein after determining the relative compensation brightness parameter corresponding to the binding-point grayscale value according to the initial-state control parameter, the initial-state brightness parameters, and the reference brightness parameter corresponding to each binding-point grayscale value, the control method of the display panel comprises:

determining the relative compensation brightness parameter corresponding to each of the binding-point grayscale values according to the relative compensation brightness parameter corresponding to each of the binding-point grayscale values, and determining a plurality of relative compensation brightness parameters corresponding to a plurality of non-binding-point grayscale values, wherein two of the binding-point grayscale values comprise at least one of the non-binding-point grayscale values.

7. A control method of a display panel, comprising:

obtaining at least one binding-point grayscale value;

determining an initial-state control parameter, an initial-state brightness parameter, and a reference brightness parameter corresponding to to-be-regulated regions according to each of the binding-point grayscale value;

judging whether a ratio of the initial-state brightness parameter to the reference brightness parameter corresponding to each binding-point grayscale value is within a preset range; and determining a relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range;

wherein determining the corresponding initial-state brightness parameter according to each binding-point grayscale value further comprises:

regulating a reference region according to the initial-state control parameter, and obtaining a regulated brightness value of the reference region for inclusion in the corresponding reference brightness parameter, wherein a vertical crosstalk phenomenon in the reference region is weaker than a vertical crosstalk phenomenon in the to-be-regulated region.

8. The control method of the display panel as claimed in claim 7, wherein determining the corresponding initial-state brightness parameter according to each binding-point grayscale value comprises:

determining the corresponding initial-state control parameter according to the binding-point grayscale value, regulating the to-be-regulated region according to the initial-state control parameter, and obtaining a regulated brightness value of the to-be-regulated region for inclusion in the corresponding initial-state brightness parameter.

9. The control method of the display panel as claimed in claim 8, wherein determining the corresponding initial-state brightness parameter according to each binding-point grayscale value further comprises:

obtaining a regulated color coordinate of the to-be-regulated region for inclusion in the corresponding initial-state brightness parameter.

10. The control method of the display panel as claimed in claim 8, wherein determining the relative compensation brightness parameter corresponding to the binding-point grayscale value according to the initial-state control parameter, the initial-state brightness parameters, and the reference brightness parameter corresponding to each binding-point grayscale value, the control method of the display panel comprises:

regulating a control parameter of the to-be-regulated region until a brightness parameter of the to-be-regulated region changes into a corresponding final-state brightness parameter from the initial-state brightness parameter, wherein a ratio of the corresponding final-state brightness parameter to the reference brightness parameter is within the preset range; obtaining a final-state control parameter corresponding to the to-be-regulated region, wherein the final-state control parameter allows the final-state brightness parameter to be in the to-be-regulated region; and determining the corresponding relative compensation brightness parameter according to the corresponding initial-state control parameter and the corresponding final-state control parameter.

11. The control method of the display panel as claimed in claim 7, wherein after judging whether the ratio of the initial-state brightness parameter to the reference brightness parameter corresponding to each binding-point grayscale value is within the preset range, the control method of the display panel comprises:

using 0 as the relative compensation brightness parameter corresponding to the binding-point grayscale value when the ratio of the initial-state brightness parameter to the reference brightness parameter corresponding to the at least one binding-point grayscale value is within the preset range.

12. The control method of the display panel as claimed in claim 7, wherein obtaining the at least one binding-point grayscale value comprises:

obtaining at least two binding-point grayscale values, wherein after determining the relative compensation brightness parameter corresponding to the binding-point grayscale value according to the initial-state control parameter, the initial-state brightness parameters, and the reference brightness parameter corresponding to each binding-point grayscale value, the control method of the display panel comprises:

determining the relative compensation brightness parameter corresponding to each of the binding-point grayscale values according to the relative compensation brightness parameter corresponding to each of the binding-point grayscale values, and determining a plurality of relative compensation brightness parameters corresponding to a plurality of non-binding-point grayscale values, wherein two of the binding-point grayscale values comprise at least one of the non-binding-point grayscale values.

13. The control method of the display panel as claimed in claim 7, wherein after determining the relative compensation brightness parameter corresponding to the binding-point grayscale value according to the initial-state control parameter, the initial-state brightness parameters, and the reference brightness parameter corresponding to each binding-point grayscale value, the control method of the display panel comprises:

obtaining a relative parameter of a hopping region, wherein a plurality of data lines are shared in the hopping region and the to-be-regulated region; and determining an absolute compensation brightness parameter corresponding to the binding-point grayscale value according to the relative parameter and the relative compensation brightness parameter and on a basis of an absolute parameter.

14. A display device, comprising a controller and a storage appliance, wherein the controller is configured to execute various instructions stored in the storage appliance to realize a control method of a display panel, wherein the control method of the display panel comprises:

obtaining at least one binding-point grayscale value;

determining an initial-state control parameter, an initial-state brightness parameter, and a reference brightness parameter corresponding to to-be-regulated regions according to each of the binding-point grayscale value;

judging whether a ratio of the initial-state brightness parameter to the reference brightness parameter corresponding to each binding-point grayscale value is within a preset range; and determining a relative compensation brightness parameter corresponding to the binding-point grayscale value according to the initial-state control parameter, the initial-state brightness parameter, and the reference brightness parameter corresponding to the binding-point grayscale value, when the ratio of the initial-state brightness parameter to the reference brightness parameter corresponding to the at least one binding-point grayscale value is not within the preset range;

wherein determining the corresponding initial-state brightness parameter according to each binding-point grayscale value further comprises:

regulating a reference region according to the initial-state control parameter, and obtaining a regulated brightness value of the reference region for inclusion in the corresponding reference brightness parameter, wherein a vertical crosstalk phenomenon in the reference region is weaker than a vertical crosstalk phenomenon in the to-be-regulated region.

15. The display device as claimed in claim 14, wherein determining the corresponding initial-state brightness parameter according to each binding-point grayscale value comprises:

determining the corresponding initial-state control parameter according to the binding-point grayscale value, regulating the to-be-regulated region according to the initial-state control parameter, and obtaining a regulated brightness value of the to-be-regulated region for inclusion in the corresponding initial-state brightness parameter.

16. The display device as claimed in claim 15, wherein determining the relative compensation brightness parameter corresponding to the binding-point grayscale value according to the initial-state control parameter, the initial-state brightness parameters, and the reference brightness parameter corresponding to each binding-point grayscale value, the control method of the display panel comprises:

regulating a control parameter of the to-be-regulated region until a brightness parameter of the to-be-regulated region changes into a corresponding final-state brightness parameter from the initial-state brightness parameter, wherein a ratio of the corresponding final-state brightness parameter to the reference brightness parameter is within the preset range; obtaining a final-state control parameter corresponding to the to-be-regulated region, wherein the final-state control parameter allows the final-state brightness parameter to be in the to-be-regulated region; and determining the corresponding relative compensation brightness parameter according to the corresponding initial-state control parameter and the corresponding final-state control parameter.

17. The display device as claimed in claim 14, wherein obtaining the at least one binding-point grayscale value comprises:

obtaining at least two binding-point grayscale values, wherein after determining the relative compensation brightness parameter corresponding to the binding-point grayscale value according to the initial-state control parameter, the initial-state brightness parameters, and the reference brightness parameter corresponding to each binding-point grayscale value, the control method of the display panel comprises:

determining the relative compensation brightness parameter corresponding to each of the binding-point grayscale values according to the relative compensation brightness parameter corresponding to each of the binding-point grayscale values, and determining a plurality of relative compensation brightness parameters corresponding to a plurality of non-binding-point grayscale values, wherein two of the binding-point grayscale values comprise at least one of the non-binding-point grayscale values.

18. The display device as claimed in claim 14, wherein after determining the relative compensation brightness parameter corresponding to the binding-point grayscale value according to the initial-state control parameter, the initial-state brightness parameters, and the reference brightness parameter corresponding to each binding-point grayscale value, the control method of the display panel comprises:

obtaining a relative parameter of a hopping region, wherein a plurality of data lines are shared in the hopping region and the to-be-regulated region; and determining an absolute compensation brightness parameter corresponding to the binding-point grayscale value according to the relative parameter and the relative compensation brightness parameter and on a basis of an absolute parameter.

* * * * *